US011811650B2

(12) United States Patent
Bagwell et al.

(10) Patent No.: US 11,811,650 B2
(45) Date of Patent: Nov. 7, 2023

(54) SYSTEMS AND METHODS FOR USER PLANE FUNCTION ("UPF") OFFLOAD AT CONFIGURABLE ROUTING FABRIC

(71) Applicant: Verizon Patent and Licensing Inc., Basking Ridge, NJ (US)

(72) Inventors: Myron Eugene Bagwell, Southlake, TX (US); Niranjan B. Avula, Frisco, TX (US); Kalyani Bogineni, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/815,327

(22) Filed: Jul. 27, 2022

(65) Prior Publication Data

US 2022/0360523 A1 Nov. 10, 2022

Related U.S. Application Data

(63) Continuation of application No. 16/929,415, filed on Jul. 15, 2020, now Pat. No. 11,431,621.

(51) Int. Cl.
*H04L 47/2441* (2022.01)
*H04L 45/30* (2022.01)
*H04L 12/46* (2006.01)
*H04L 69/22* (2022.01)
*H04L 45/586* (2022.01)
*H04L 45/741* (2022.01)
*H04L 47/70* (2022.01)
(Continued)

(52) U.S. Cl.
CPC .......... *H04L 45/30* (2013.01); *H04L 12/4633* (2013.01); *H04L 45/586* (2013.01); *H04L 45/741* (2013.01); *H04L 47/825* (2013.01); *H04L 63/164* (2013.01); *H04L 67/56* (2022.05); *H04L 69/22* (2013.01); *H04L 47/2441* (2013.01)

(58) Field of Classification Search
None
See application file for complete search history.

(56) References Cited

U.S. PATENT DOCUMENTS

| 2014/0126371 | A1  | 5/2014 | Choi et al. | |
| 2016/0072717 | A1* | 3/2016 | Ansari | H04L 45/64 370/412 |
| 2019/0124572 | A1* | 4/2019 | Park | H04W 36/08 |

(Continued)

OTHER PUBLICATIONS

"5G; NG-RAN; POU Session User Plane protocol (3GPP TS 38.415 version 15.0.0 Release 15)", ETSI TS 138 415 V15.0.0 (Jul. 2018), Jul. 2018.

*Primary Examiner* — Jenkey Van

(57) ABSTRACT

A system described herein may provide for the separation of functions associated with a User Plane Function ("UPF") in a wireless network (e.g., a Fifth Generation ("5G") network), such that routing devices associated with the wireless network may perform functionality that would otherwise be performed by virtualized hosts or other configurable resources. For example, routing components which form a backhaul or other portion of the network may process traffic according to a suitable set of policies (e.g., Quality of Service ("QoS") policies, content filtering policies, queueing policies, and/or other policies) instead of transmitting such traffic to a UPF associated with the network core for processing.

20 Claims, 10 Drawing Sheets

(51) Int. Cl.
*H04L 9/40* (2022.01)
*H04L 67/56* (2022.01)

(56) References Cited

U.S. PATENT DOCUMENTS

| | | |
|---|---|---|
| 2019/0132251 A1 | 5/2019 | Dao et al. |
| 2020/0204492 A1 | 6/2020 | Sarva et al. |
| 2020/0371828 A1 | 11/2020 | Chiou et al. |
| 2021/0083967 A1* | 3/2021 | Joshi ................ H04L 43/20 |
| 2021/0409316 A1* | 12/2021 | Seshan ............... H04L 45/42 |
| 2022/0393974 A1* | 12/2022 | Wen .................. H04L 45/54 |

* cited by examiner

SYSTEMS AND METHODS FOR USER PLANE FUNCTION ("UPF") OFFLOAD AT CONFIGURABLE ROUTING FABRIC

CROSS-REFERENCE TO RELATED APPLICATION

This Application is a Continuation of U.S. patent application Ser. No. 16/929,415, filed on Jul. 15, 2020, titled "SYSTEMS AND METHODS FOR USER PLANE FUNCTION ("UPF") OFFLOAD AT CONFIGURABLE ROUTING FABRIC," the contents of which are herein incorporated by reference in their entirety.

BACKGROUND

Wireless networks, such as Fifth Generation ("5G") networks, may make use of Virtualized Network Functions ("VNFs") at a network core to process traffic, including the enforcement of traffic policies (e.g., Quality of Service ("QoS") policies, filtering, and/or other policies) and the routing of traffic to its intended destination. For example, a User Plane Function ("UPF") of a 5G core ("5GC") may apply traffic policies to traffic received from a radio access network ("RAN") and may forward such traffic to an external network, such as the Internet. Similarly, the UPF may receive traffic from the external network, apply appropriate traffic policies, and forward the traffic toward a User Equipment ("UE"), such as a wireless telephone, via the RAN.

DETAILED DESCRIPTION OF THE PREFERRED EMBODIMENTS

The following detailed description refers to the accompanying drawings. The same reference numbers in different drawings may identify the same or similar elements.

Embodiments described herein provide for the separation of functions associated with a UPF in a wireless network (e.g., a 5G network), such that routing devices associated with the wireless network may perform functionality that would otherwise be performed by virtualized hosts or other configurable resources. For example, as discussed below, one or more routing components (e.g., switches, routers, or the like) which form a backhaul or other portion of the network, may process traffic according to a suitable set of policies (e.g., Quality of Service ("QoS") policies, content filtering policies, queueing policies, and/or other policies) instead of transmitting such traffic to a UPF associated with the network core for processing. Eliminating the transport of traffic to the UPF may result in lower latency for the traffic, as well as reduced usage of network resources (e.g., network resources to transport the traffic to the UPF, processing resources of virtual hosts that implement the UPF, and/or other resources).

Figure 1A:
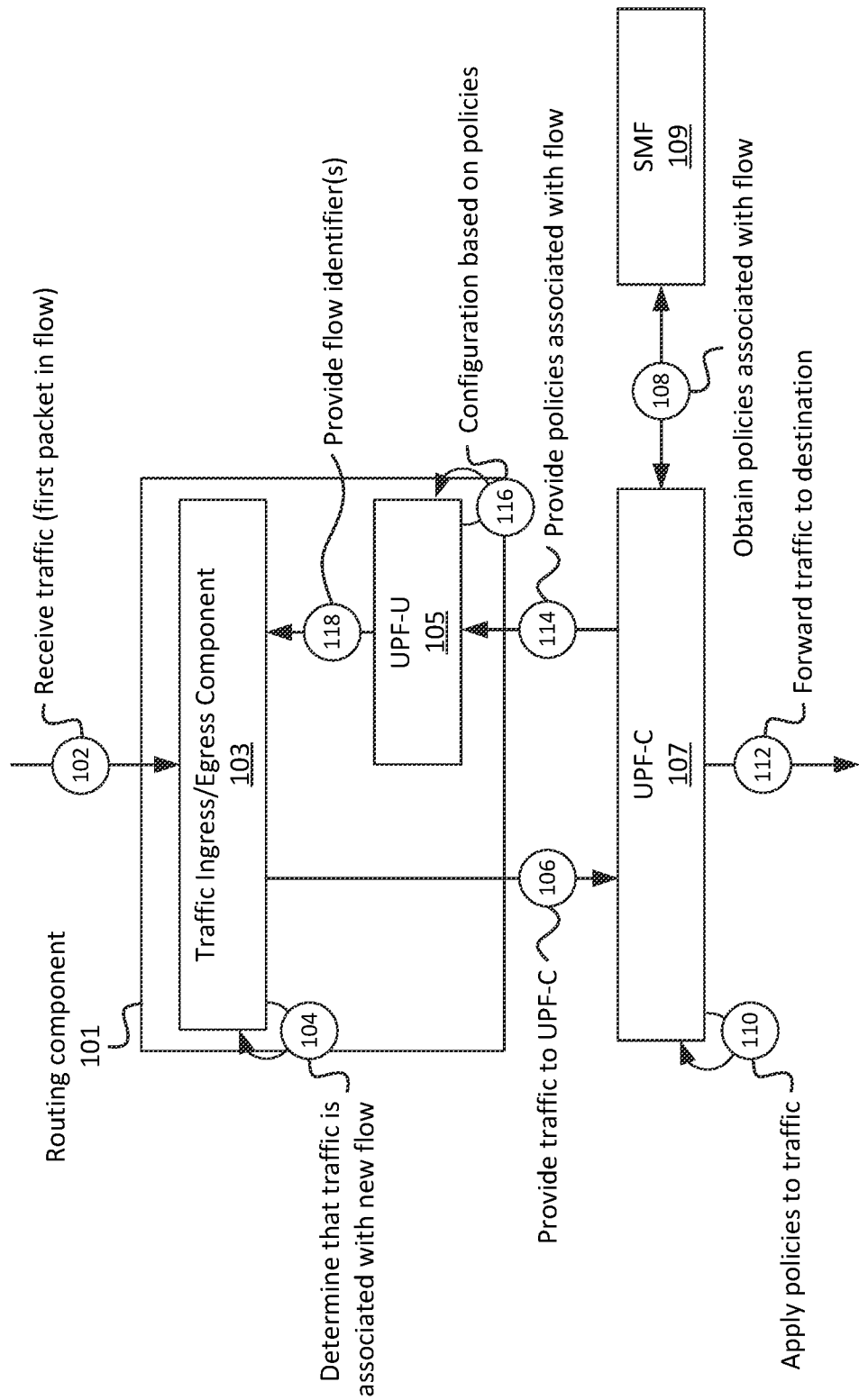
FIG. 1A illustrates an example of an establishment of a traffic flow at a routing component of a routing fabric, in accordance with some embodiments.

For example, as shown in FIG. 1A, routing component 101 may include traffic ingress/egress component ("TIEC") 103, and UPF-User plane ("UPF-U") 105. In some embodiments, routing component 101 may be, may be implemented by, and/or or may include a router, switch, and/or other type of device that receives traffic and forwards the traffic toward an intended destination. For example, routing component 101 may route and/or forward traffic based on header information (e.g., Internet Protocol ("IP") header information, General Packet Radio Service ("GPRS") Tunneling Protocol ("GTP") header information, and/or other types of header information).

In some embodiments, TIEC 103 may include, implement, and/or provide a physical interface for traffic. As discussed herein, TIEC 103 may, in some embodiments, identify whether traffic is associated with a previously established flow, and may handle traffic in a differentiated manner based on whether received traffic is associated with a previously established flow or not.

As referred to herein, a "flow" may include traffic between two devices or systems (e.g., between a User Equipment ("UE") and an application server, between two UEs, and/or between two other devices or systems). In some embodiments, a flow may refer to bi-directional communications (e.g., one flow may refer to traffic sent from a first device to a second device and from the second device to the first device). In some embodiments, a flow may refer to uni-directional communications (e.g., a first flow may refer to traffic sent from a first device to a second device, and a second flow may refer to traffic sent from the second device to the first device). In some embodiments, a flow may be based on port numbers or other identifiers associated with a particular device or system. For example, a first flow may refer to traffic sent from a first device to a first port of a second device, while a second flow may refer to traffic sent from the first device to a second port of the second device. In some embodiments, a flow may be based on a protocol associated with traffic. For example, traffic sent between first and second devices according to a first protocol may be associated with a first flow, while traffic sent between the first and second devices according to a second protocol may be associated with a second flow. In some embodiments, multiple ones of the above criteria may be used to delineate one flow from another. In some embodiments, a "5-tuple" may be used to uniquely identify a flow, where the 5-tuple includes a source address, a source port, a destination address, a destination port, and a protocol.

As shown in FIG. 1A, TIEC 103 may receive (at 102) traffic. Assume, for example, that the received traffic includes the first packet of a given flow (e.g., associated with a 5-tuple for which TIEC 103 has not previously received traffic). TIEC 103 may accordingly determine (at 104) that the traffic is associated with a new flow. For example, as discussed below, TIEC 103 may maintain information identifying established flows (e.g., flows for which TIEC 103 has previously received traffic). For example, the traffic (received at 102) may be received from a Next Generation Node B ("gNB") of a RAN (e.g., via a N3 interface). In such examples, the traffic may include GTP traffic with GTP header information, based on which TIEC 103 may identify the 5-tuple and/or may otherwise identify the flow (if applicable) with which the traffic is associated. Accordingly, TIEC 103 may identify a 5-tuple and/or other information included in, or derived from, a GTP header of the traffic received from the gNB via the N3 interface.

As another example, the traffic (received at 102) may be received from a packet data network ("PDN"), such as the Internet. In some embodiments, such traffic may be received via a N6 interface. Such traffic may be, in some embodiments, IP traffic and/or some other type of traffic. For example, such traffic may include an IP header, from which TIEC 103 may identify a 5-tuple or other flow identifying information.

In some embodiments, TIEC 103 may maintain a mapping between 5-tuples (or other identifiers) for different types of traffic, traffic received from different sources, and/or traffic received via different interfaces. For example, as discussed above, TIEC 103 may send and/or receive GTP traffic via a N3 interface, and may send and/or receive IP traffic via a N6 interface. In some embodiments, the IP traffic sent and/or received via the N6 interface may be encapsulated in the GTP traffic sent and/or received via the N3 interface. As discussed below, TIEC 103 may receive (e.g., from UPF-U 105) mapping information based on which one set of traffic (e.g., GTP traffic) may be mapped to another set of traffic (e.g., IP traffic). In this manner, TIEC 103 may logically maintain information indicating that both sets of traffic are associated with the same flow. In some embodiments, as discussed above, TIEC 103 may maintain both sets of traffic as different flows. As noted above, identifying whether traffic is associated with an existing flow may affect how TIEC 103 handles the traffic.

For example, as shown in FIG. 1A, based on determining (at 104) that the packet (received at 102) is not associated with an existing flow (e.g., is associated with a new flow), TIEC 103 may provide (at 106) the packet to UPF-C 107. For example, UPF-C 107 may be indicated as a destination in header information associated with the packet, based on which TIEC 103 (and/or some other component of routing component 101) may forward the packet to UPF-C 107. For example, UPF-C 107 may be indicated as a GTP endpoint (in situations where the packet is a GTP packet) and/or as an IP destination (in situations where the packet is an IP packet).

UPF-C 107 may obtain (at 108) policies associated with the packet from SMF 109 and/or some other device or system. For example, UPF-C 107 may be communicatively coupled to SMF 109 via a N4 interface. As noted above, the policies may include QoS policies, content filtering policies, and/or other suitable policies. Additionally, or alternatively, UPF-C 107 may determine policy information based on information included in header information of the traffic. For example, the header information may include one or more QoS identifiers, Differentiated Services Code Point ("DSCP") markings, and/or other indicators of policies associated with the traffic.

UPF-C 107 may accordingly apply (at 110) the policies to the traffic. For example, UPF-C 107 may queue the traffic in a manner indicated by the policies, drop traffic in a manner indicated by the policies, limit a bitrate associated with the traffic in manner indicated by the policies, and/or otherwise "treat" the traffic in accordance with the policies. In some embodiments, UPF-C 107 may perform one or more other functions, such as removing GTP header information for traffic received via a N3 interface (e.g., from a gNB), and/or adding GTP header information for traffic to be forwarded via a N3 interface (e.g., to a gNB). Once UPF-C 107 has applied (at 110) the policies to the traffic, UPF-C 107 may forward (at 112) the treated traffic toward its destination. For example, UPF-C 107 may output the traffic to routing component 101, to another instance of routing component 101, and/or to some other device or system (e.g., a "next hop" in a route to the traffic's destination).

Additionally, UPF-C 107 may provide (at 114) an indication of the one or more policies (e.g., as obtained at 108) to UPF-U 105. For example, UPF-C 107 may communicate with UPF-U 105 via an application programming interface ("API"), a messaging protocol, and/or some other suitable communication pathway, in order to indicate that UPF-C 107 is providing policy information associated with the traffic provided (at 106) to UPF-C 107. For example, UPF-C 107 may indicate one or more flow identifiers, such as a 5-tuple of the traffic sent to UPF-C 107. The flow identifier (e.g., 5-tuple) may, in some embodiments, be the same flow identifier determined (at 104) by TIEC 103.

For example, in situations where the traffic (received at 102) is GTP traffic, UPF-C 107 may denote that the policies (provided at 114) are associated with the 5-tuple of the GTP header of the traffic. In some embodiments, UPF-C 107 may also provide (at 114) mapping information, such as an IP 5-tuple. Such information may be determined by UPF-C 107 by removing GTP header information and extracting a payload of the GTP packet (e.g., an IP packet). In this manner, the policy information may be associated with traffic matching the GTP 5-tuple and the IP 5-tuple. Thus, in such embodiments, the policy information may be associated with a bi-directional flow.

As another example, in situations where the traffic (received at 102) is IP traffic, UPF-C 107 may denote that the policies (provided at 114) are associated with the 5-tuple of the IP header of the traffic. In some embodiments, UPF-C 107 may also provide (at 114) mapping information, such as a GTP 5-tuple. Such information may be identified by UPF-C 107 when adding GTP header information for forwarding toward an appropriate destination (e.g., a gNB associated with a UE to which the IP traffic is destined). In this manner, the policy information may be also associated with traffic matching the GTP 5-tuple and the IP 5-tuple. Thus, in such embodiments also, the policy information may be associated with a bi-directional flow.

In some embodiments, when providing (at 114) the policies associated with the flow, UPF-C 107 may provide only a flow identifier for the traffic as received from routing component 101. For example, in situations where UPF-C 107 receives GTP traffic from routing component 101, UPF-C 107 may provide a GTP 5-tuple (and/or other information derived from a GTP header of the traffic) to UPF-U 105. As another example, in situations where UPF-C 107 receives IP traffic from routing component 101, UPF-C 107 may provide an IP 5-tuple (and/or other information derived from an IP header of the traffic) to UPF-U 105.

In some embodiments, when providing (at 114) the policy information to UPF-U 105, UPF-C 107 may provide an index, indicator, identifier, or the like of one or more policies. In some embodiments, the policy information may include a QoS identifier, DSCP marking, and/or other suitable policy indicator. As discussed above, such identifiers, indicators, etc. may have been received (at 108) from SMF (or some other source), and/or may have been extracted from the traffic itself (e.g., from header information of the traffic). In some embodiments, UPF-C 107 may also notify SMF 109 that the flow has been established.

In some embodiments, UPF-U 105 may be, may be implemented by, and/or may include configurable network processing hardware. For example, UPF-U 105 may be, may be implemented by, and/or may include a Field Programmable Gate Array ("FPGA"). The FPGA may be configurable using the P4 programming language, another programming language, and/or some other suitable configuration technique. UPF-U 105 may perform (at 116) a configuration process (e.g., may configure the FPGA) based on the received policies. For example, UPF-U 105 may maintain (e.g., in a storage device associated with UPF-U 105 and/or routing component 101) and/or may otherwise access mapping information that indicates particular configuration parameters that are associated with particular policies. For example, the mapping information may indicate that a first set of configuration parameters are associated with a first policy (or set of policies), while a second set of configuration parameters are associated with a second policy (or set of policies). In some embodiments, the configuration parameters may include one or more modules, such as P4 modules, that indicate how UPF-U 105 will treat traffic associated with a matching flow.

The configuration parameters, once configured at UPF-U 105, may cause UPF-U 105 to treat traffic in a manner consistent with the policies (provided at 114) associated with a particular flow with which the traffic is associated. For example, UPF-U 105 may perform QoS-related traffic treatment, buffering, traffic duplication, access control, lawful interception, performance management counter collection (e.g., to track an amount of traffic associated with a given flow), GTP termination (e.g., in lieu of UPF-C 107, for GTP traffic that indicates UPF-C 107 as an endpoint), redirection, gating, steering, and/or other suitable treatment as indicated in the received policies.

As such, the functionality performed by UPF-U 105 may include some UPF-related functionality (e.g., QoS and/or other policy enforcement), while UPF-C 107 may perform other UPF-related functionality, such as determining which policies to enforce for given flows. Further, UPF-C 107 may be provisioned on configurable resources of a core network (e.g., on one or more virtualized hosts, cloud computing platforms, or the like), while UPF-U 105 may be implemented using networking hardware that is purpose-built for managing traffic flows (e.g., a P4-programmable FPGA and/or some other type of suitable hardware).

In some embodiments, UPF-C 107 may provide (at 114) the policy information to another device or system, which may relay the policy information to UPF-U 105. For example, as discussed below, multiple instances of routing component 101 may be deployed within the network, and may maintain copies of a master flow table (e.g., as provided by a central routing controller or some other device or system). In such embodiments, the central routing controller may propagate policy information to multiple instances of routing component 101 (e.g., to corresponding instances of UPF-U 105).

UPF-U 105 may provide (at 118) the flow identifier (or identifiers) associated with the received traffic to TIEC 103.

Figure 1B:
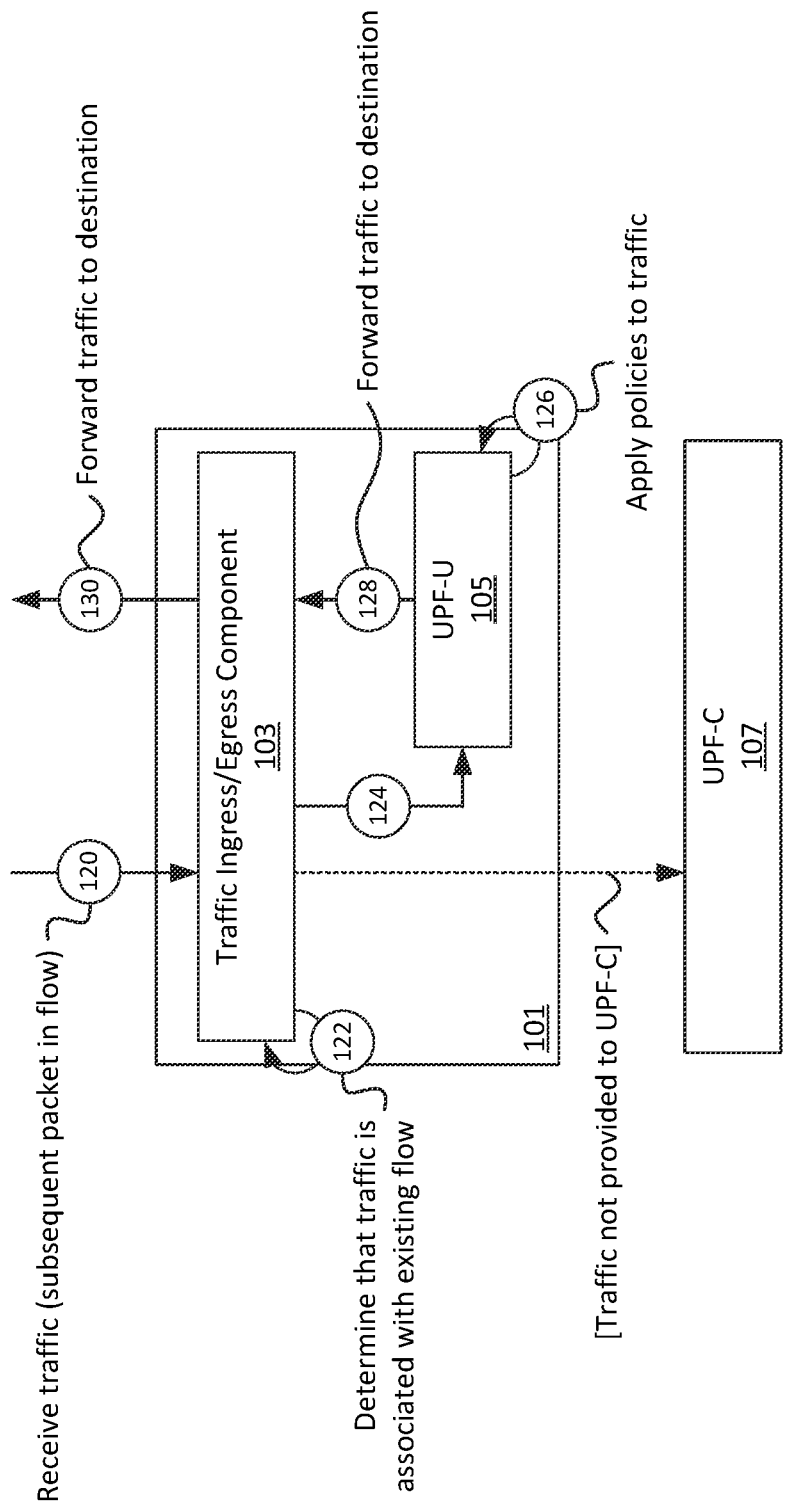
FIG. 1B illustrates an example processing of traffic, associated with an established traffic flow, by the routing component of the routing fabric in lieu of providing the traffic to a component of a core network for processing, in accordance with some embodiments.

In this manner, TIEC 103 may maintain information indicating that the flow has been established, and that the flow is associated with the one or more identifiers provided (at 118) by UPF-U 105. For example, as shown in FIG. 1B, routing component 101 may receive (at 120) subsequent traffic in the same flow previously established in the example of FIG. 1A. TIEC 103 may determine (at 122) that the traffic is associated with an existing flow by identifying a 5-tuple or other flow identifying information from the traffic (e.g., from a header of the traffic) and comparing such information to flow identifying information previously received (e.g., at 118).

Based on determining that the traffic is associated with an existing flow, TIEC 103 may refrain from providing the traffic to UPF-C 107 (as denoted in the figure by the dashed line between TIEC 103 and UPF-C 107). Instead, in accordance with some embodiments, TIEC 103 may provide (at 124) the traffic to UPF-U 105. For example, TIEC 103 may disregard a destination indicated in header information of the traffic, may disregard a "next hop" indicated by routing information associated with the traffic, and/or may otherwise reroute the traffic from UPF-C 107 to UPF-U 105.

As noted above, UPF-U 105 and TIEC 103 may be implemented by the same device or system (e.g., routing component 101), thus eliminating the use of network resources to transport the traffic from routing component 101 to UPF-C 107. Once UPF-U 105 receives (at 124) the traffic, UPF-U 105 may identify one or more policies to apply to the traffic. As discussed above, UPF-U 105 may have received (at 114) policy information from UPF-C 107, as well as one or more identifiers (e.g., 5-tuples and/or other suitable identifiers) with which such policies are associated. UPF-U 105 may accordingly apply (at 126) the applicable policies to the traffic, such as QoS treatment and/or other suitable treatment based on the policies.

UPF-U 105 may also perform encapsulation, decapsulation, and/or other routing-related functionality. For example, when receiving GTP traffic (e.g., from a gNB via a N3 interface), UPF-U 105 may remove GTP information and identify header information (e.g., an IP 5-tuple and/or other header information) of a packet (e.g., an IP packet and/or some other type of packet) included within the GTP packet. UPF-U 105 may determine a destination a "next hop" for the packet based on the header information and/or based on other parameters, and may forward (at 128) the traffic toward the destination (e.g., via a N6 interface, in some embodiments). In some embodiments, UPF-U 105 may add or modify header information prior to forwarding (at 128) the traffic. In another example, UPF-U 105 may receive traffic (e.g., IP traffic) from a PDN (e.g., via a N6 interface), determine a gNB to which the traffic should be forwarded (e.g., based on previously received or established flow information), encapsulate the received traffic (e.g., in a GTP packet), and forward (at 128) the received and/or encapsulated traffic toward the gNB (e.g., via a N3 interface). TIEC 103 may accordingly forward (at 130) the traffic (output by UPF-U 105 at 128) toward the destination associated with the traffic (e.g., as indicated by UPF-U 105).

Figure 2:
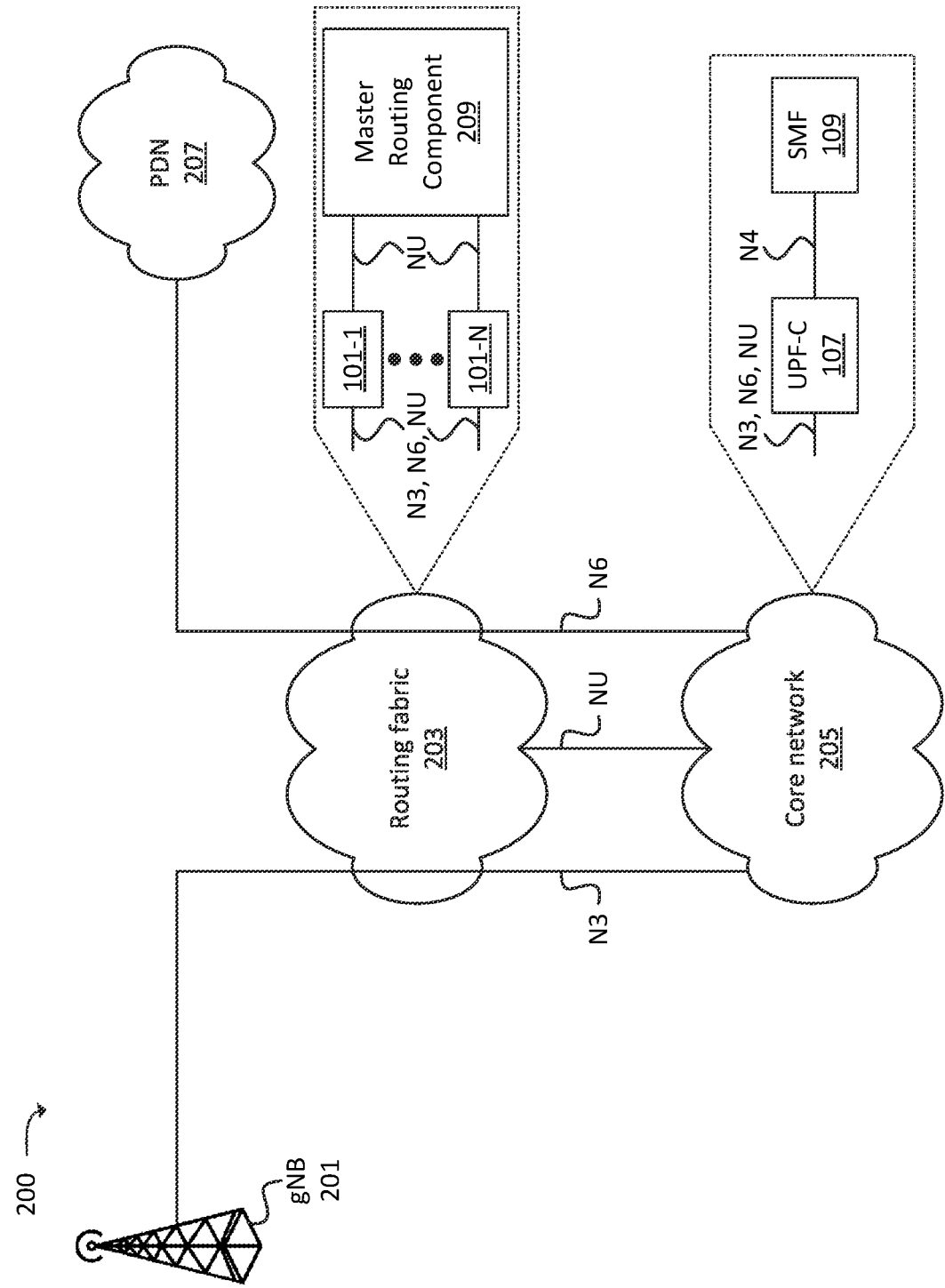
FIG. 2 illustrates an example environment in which one or more embodiments, described herein, may be implemented.
Figure 3:
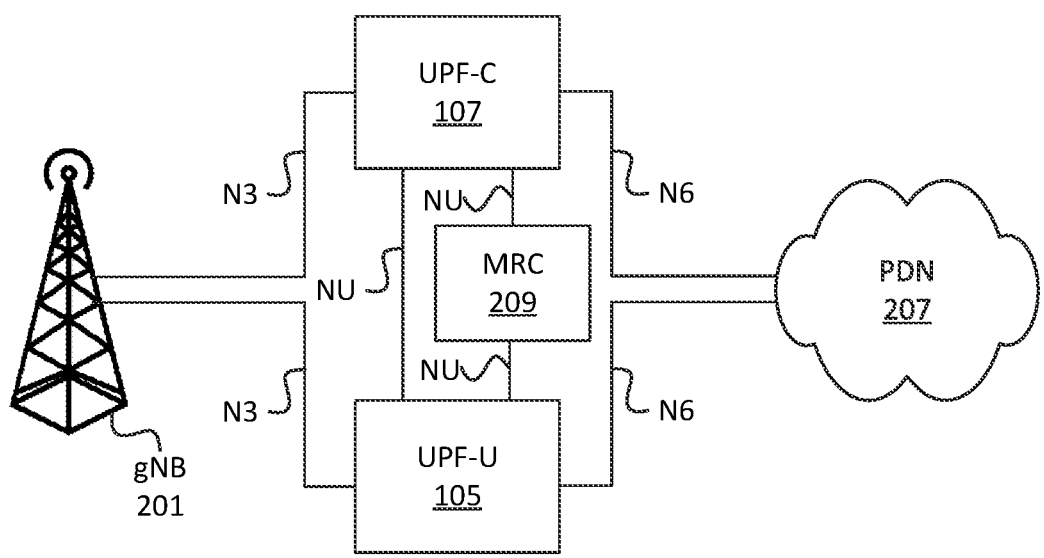
FIG. 3 illustrates example interfaces between elements of the environment shown in FIG. 2, in accordance with some embodiments.

FIG. 2 illustrates an example environment 200, in which some embodiments may be implemented. FIG. 3 provides another representation of some of the communication pathways between devices or systems shown in FIG. 2, and the following description will refer to FIGS. 2 and 3. As shown in FIG. 2, environment 200 may include gNB 201, routing fabric 203, core network 205, and PDN 207. Although one gNB 201 is shown, in practice, multiple gNBs 201 may be deployed in one or more RANs. As further shown, gNB 201 may be communicatively coupled to one or more elements of routing fabric 203 and/or core network 205 via a N3 interface. For example, as shown in FIG. 3, gNB 201 may be communicatively coupled to UPF-U 105 (e.g., to one or more instances of routing component 101) via the N3 interface. In some embodiments, the N3 interface may be associated with a GTP protocol, may include one or more GTP tunnels, and/or may be associated with another suitable protocol.

As shown in FIG. 2, routing fabric 203 may include one or more instances of routing component 101 (e.g., routing component 101-1 through routing component 101-N, where N is an integer greater than 1). As discussed above, routing component 101 may include UPF-U 105, which may, in some situations (e.g., for established flows), serve as a GTP endpoint and/or may otherwise communicate with one or more gNBs 201 via the N3 interface. As also discussed above, routing component 101 (e.g., UPF-U 105, as shown in FIG. 3) may also communicate with PDN 207 via a N6 interface. For example, routing component 101 may use IP messaging and/or some other suitable protocol to send and/or receive traffic to and/or from PDN 207. As discussed above, in some situations (e.g., for established flows), routing component 101 may perform treatment on traffic based on policies associated with particular traffic flows instead of forwarding the traffic to UPF-C 107 for treatment. For example, traffic received via the N3 and/or N6 interface may be processed by routing component 101 (e.g., by UPF-U 105) instead of forwarding the traffic to UPF-C 107 for processing.

In some embodiments, routing fabric 203 may include master routing component 209, which may propagate policies to multiple instances of routing component 101. For example, as discussed above, UPF-U 105 associated with a first routing component 101 may receive policies associated with a particular flow from UPF-C 107. In some embodiments, the first routing component 101 may provide the policies along with one or more flow identifiers (e.g., one or more 5-tuples, such as a GTP 5-tuple and/or an IP 5-tuple) to master routing component 209 along with one or more identifiers of the policies associated with the flow. Master routing component 209 may propagate such flow identifier(s) and policy information to other instances of routing component 101, such that other instances of routing component 101 may enforce the policies for traffic associated with the flow, in situations that other instances of routing component 101 receive such traffic.

In some embodiments, master routing component 209 may receive information from a particular routing component 101, indicating that the flow has terminated. For example, the particular routing component 101 may have received an explicit indicator that the flow has terminated (e.g., an "end of flow" message) and/or may otherwise determine that the flow has ended (e.g., if traffic associated with the flow has not been received for at least a threshold amount of time). The particular routing component 101 may, in such situations, remove or "tear down" information associated with the flow, including removing information maintained by TIEC 103 indicating that traffic associated with the flow should be handled by UPF-U 105 rather than forwarding the traffic to UPF-C 107, as well as removing configuration information for UPF-U 105 that is used by UPF-U 105 to enforce policies associated with the flow. Further, routing component 101 may indicate to master routing component 209 that the flow has ended, and master routing component 209 may accordingly propagate the indication to other instances of routing component 101. In this manner, the other instances of routing component 101 may also remove information associated with the flow, thus freeing resources allocated to identifying the flow and enforcing associated policies.

Routing component 101 may also communicate with one or more instances of UPF-C 107 via an interface shown in FIGS. 2 and 3 as an "NU" interface. Via the NU interface, UPF-C 107 may provide policy information when obtaining or receiving such information (e.g., from SMF 109 via the N4 interface and/or from some other source). In some embodiments, communications via the NU interface may include IP messages, GTP messages, and/or some other suitable type of message or protocol. In some embodiments, UPF-U 105 may provide information to UPF-C 107 indicating amounts of traffic processed by UPF-U 105. UPF-C 107 may notify SMF 109 and/or one or more other devices or systems indicating amounts of traffic processed by UPF-U 105 and/or UPF-C 107. In this manner, the amount of traffic carried to and/or from particular UEs may be recorded. In some embodiments, UPF-C 107 may provide updated policies to UPF-U 105 via the NU interface. For example, UPF-C 107 may receive updates to policies associated with one or more flows (e.g., from SMF 109), and may provide such updates to UPF-U 105.

While only UPF-C 107 and SMF 109 are shown in this figure as being included in core network 205, in practice core network 205 may include one or more other devices, systems, VNFs, etc. to provide services to UEs connected to gNBs 201 and/or other types of base stations. An example arrangement of elements of core network 205 is provided below with respect to FIG. 7.

In some embodiments, as shown in FIG. 3, the NU interface may include master routing component 209. For example, as discussed above, UPF-C 107 may output (e.g., via the NU interface) policy information to master routing component 209, which may propagate (e.g., via the NU interface) such information to one or more instances of UPF-U 105.

Figure 4:
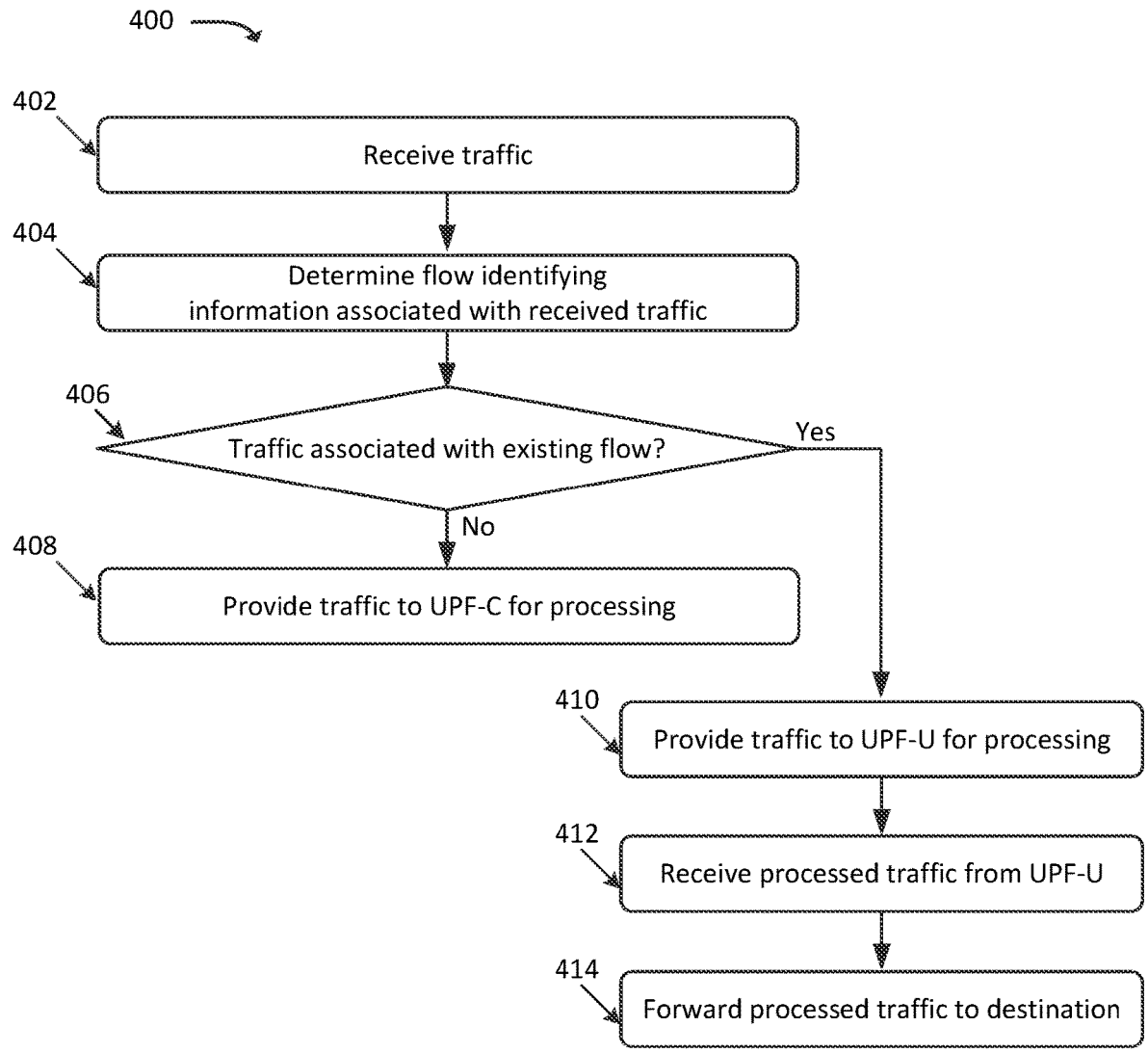
FIG. 4 illustrates an example process for routing traffic based on whether the traffic is associated with an established flow, in accordance with some embodiments.

FIG. 4 illustrates an example process 400 for routing traffic based on whether the traffic is associated with an established flow. In some embodiments, some or all of process 400 may be performed by routing component 101 (e.g., by TIEC 103). In some embodiments, one or more other devices may perform some or all of process 400 in concert with, and/or in lieu of, routing component 101.

As shown, process 400 may include receiving (at 402) traffic. For example, routing component 101 may receive traffic via TIEC 103. The traffic may, for example, include GTP traffic, IP traffic, and/or other types of traffic. The traffic may be received via a N3 interface (e.g., from gNB 201), N6 interface (e.g., from PDN 207), and/or some other type of interface or from some other source.

Process 400 may further include determining (at 404) flow identifying information associated with the received traffic. For example, routing component 101 may determine header information associated with the received traffic, such as a 5-tuple (or a portion thereof) and/or other information that may be used to uniquely identify a flow associated with the traffic.

Process 400 may additionally include determining (at 406) whether the traffic is associated with an existing flow. For example, routing component 101 (e.g., TIEC 103) may determine whether routing component 101 maintains information indicating that the flow identifying information (e.g., the identified 5-tuple or other identifying information associated with the received traffic) is associated with an existing flow. If the traffic is not associated with an existing flow (at 406—NO), then routing component 101 may provide (at 408) the traffic to UPF-C 107 for processing. For example, routing component 101 may provide the traffic to UPF-C 107 by routing and/or forwarding the traffic toward a destination indicated in header information of the traffic.

If, on the other hand, the traffic is associated with an existing flow (at 406—YES), then process 400 may include providing (at 410) the traffic to UPF-U 105 for processing. For example, providing or routing the traffic to UPF-U 105 may be performed in lieu of providing the traffic to an indicated destination of the traffic (e.g., UPF-C 107, which may be indicated in header information of the traffic). UPF-U 105 may process the traffic by performing QoS treatment and/or otherwise enforcing policies associated with the traffic. In some embodiments, UPF-U 105 may perform one or more encapsulation or decapsulation operations, which may include indicating a new destination or "next hop" for the traffic (e.g., in situations where traffic received via a N3 interface is to be output via a N6 interface or vice versa).

Process 400 may additionally include receiving (at 412) the processed traffic from UPF-U 105. For example, once UPF-U 105 has processed the traffic, UPF-U 105 may provide the traffic to TIEC 103 for egress. Accordingly, routing component 101 (e.g., TIEC 103) may forward (at 414) the traffic toward a destination indicated in the processed traffic.

Figure 5:
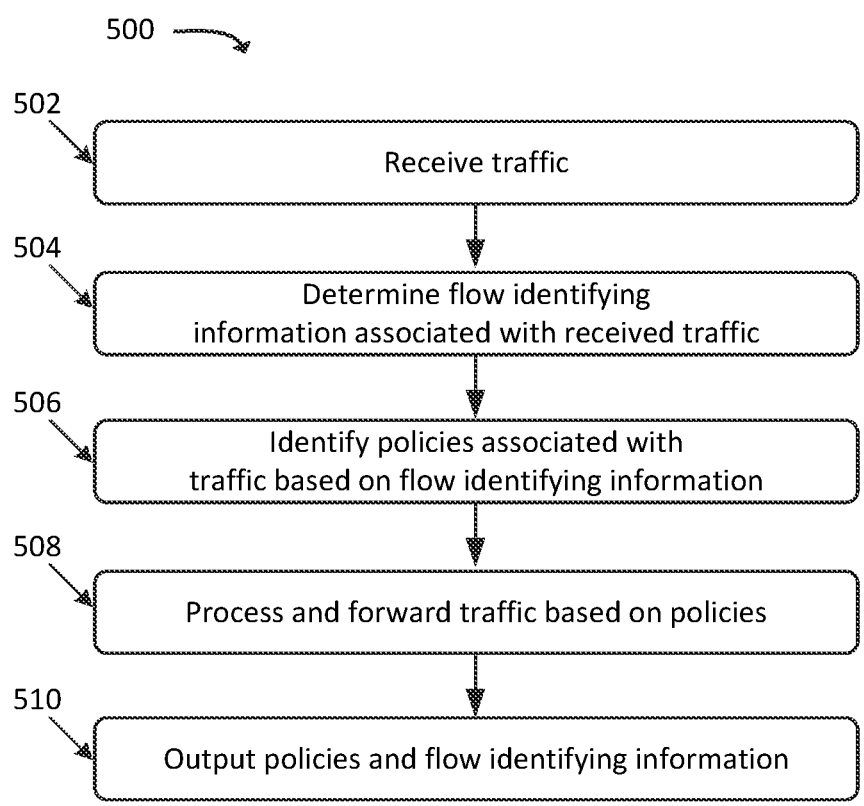
FIG. 5 illustrates an example process for processing traffic based on policies associated with the traffic, in accordance with some embodiments.

FIG. 5 illustrates an example process 500 for processing traffic based on policies associated with the traffic. In some embodiments, some or all of process 500 may be performed by UPF-C 107. In some embodiments, one or more other devices may perform some or all of process 500 in concert with, and/or in lieu of, UPF-C 107.

As shown, process 500 may include receiving (at 502) traffic. For example, UPF-C 107 may receive traffic from routing component 101, which may have received the traffic from gNB 201, PDN 207, another routing component 101, and/or some other source.

Process 500 may further include determining (at 504) flow identifying information associated with the received traffic. For example, as similarly discussed above, UPF-C 107 may determine header information associated with the traffic, such as a 5-tuple or a portion thereof.

Process 500 may additionally include identifying (at 506) policies associated with the traffic based on the flow identifying information. For example, UPF-C 107 may obtain policy information from SMF 109 and/or some other source, and/or may determine the policy information based on information included in the traffic (e.g., DSCP markings and/or other suitable information).

Process 500 may also include processing and forwarding (at 508) the traffic. For example, UPF-C 107 may perform QoS treatment and/or otherwise enforce the policies associated with the traffic, perform suitable encapsulation and/or decapsulation operations, and forward the processed traffic toward its applicable destination.

Process 500 may further include outputting (at 510) policies and flow identifying information associated with the traffic. For example, UPF-C 107 may output such information to a particular routing component 101 (e.g., a particular UPF-U 105) from which the traffic was received. Additionally, or alternatively, UPF-C 107 may output the information to master routing component 209, which may propagate the information to one or more instances of UPF-U 105.

Figure 6:
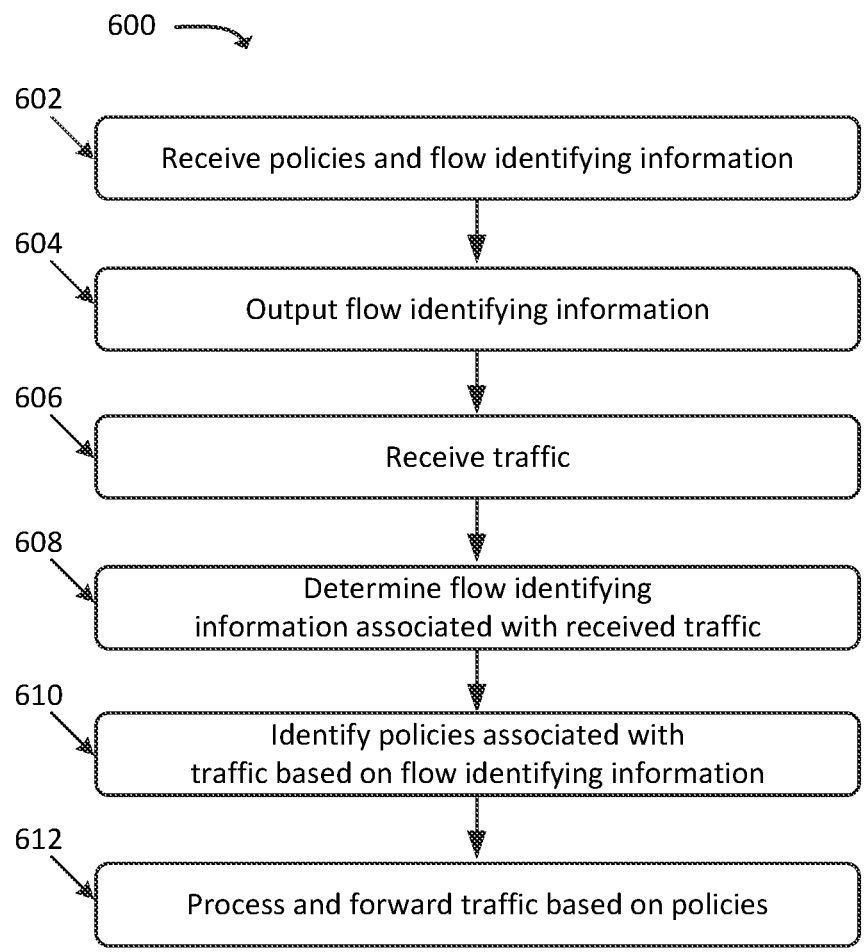
FIG. 6 illustrates an example process for processing traffic in lieu of forwarding the traffic to another device or system for processing, in accordance with some embodiments.

FIG. 6 illustrates an example process 600 for processing traffic in lieu of forwarding the traffic to another device or system (e.g., UPF-C 107) for processing. In some embodiments, some or all of process 600 may be performed by UPF-U 105 (e.g., routing component 101). In some embodiments, one or more other devices may perform some or all of process 600 in concert with, and/or in lieu of, UPF-U 105.

As shown, process 600 may include receiving (at 602) policies and flow identifying information. For example, UPF-U 105 may receive such information from UPF-C 107, master routing component 209, and/or some other source. As discussed above, UPF-U 105 may perform a configuration process based on the received policies. For example, UPF-U 105 may include FPGA or other configurable resources that may be configured (e.g., based on the P4 programming language and/or other suitable parameters) to implement the received policies for traffic associated with a given flow.

Process 600 may further include outputting (at 604) flow identifying information. For example, UPF-U 105 may output the flow identifying information to TIEC 103, in order to cause TIEC 103 to provide traffic associated with the flow to UPF-U 105 in lieu of forwarding such traffic to another device or system (e.g., to UPF-C 107).

Process 600 may additionally include receiving (at 606) traffic. For example, UPF-U 105 may receive traffic, received by routing component 101, for processing (e.g., from TIEC 103).

Process 600 may also include determining (at 608) flow identifying information associated with the received traffic. For example, as discussed above, UPF-U 105 may identify a header information associated with the traffic, such as a 5-tuple and/or a portion thereof.

Process 600 may further include identifying (at 610) policies associated with the traffic based on the flow identifying information. For example, UPF-U 105 may identify previously received (e.g., at 602) policies associated with the flow with which the traffic is associated.

Process 600 may additionally include processing and forwarding (at 612) the traffic based on the identified policies. For example, UPF-U 105 may perform QoS treatment, encapsulation and/or decapsulation operations, and/or other suitable operations on the traffic, and may forward the traffic toward its destination.

Figure 7:
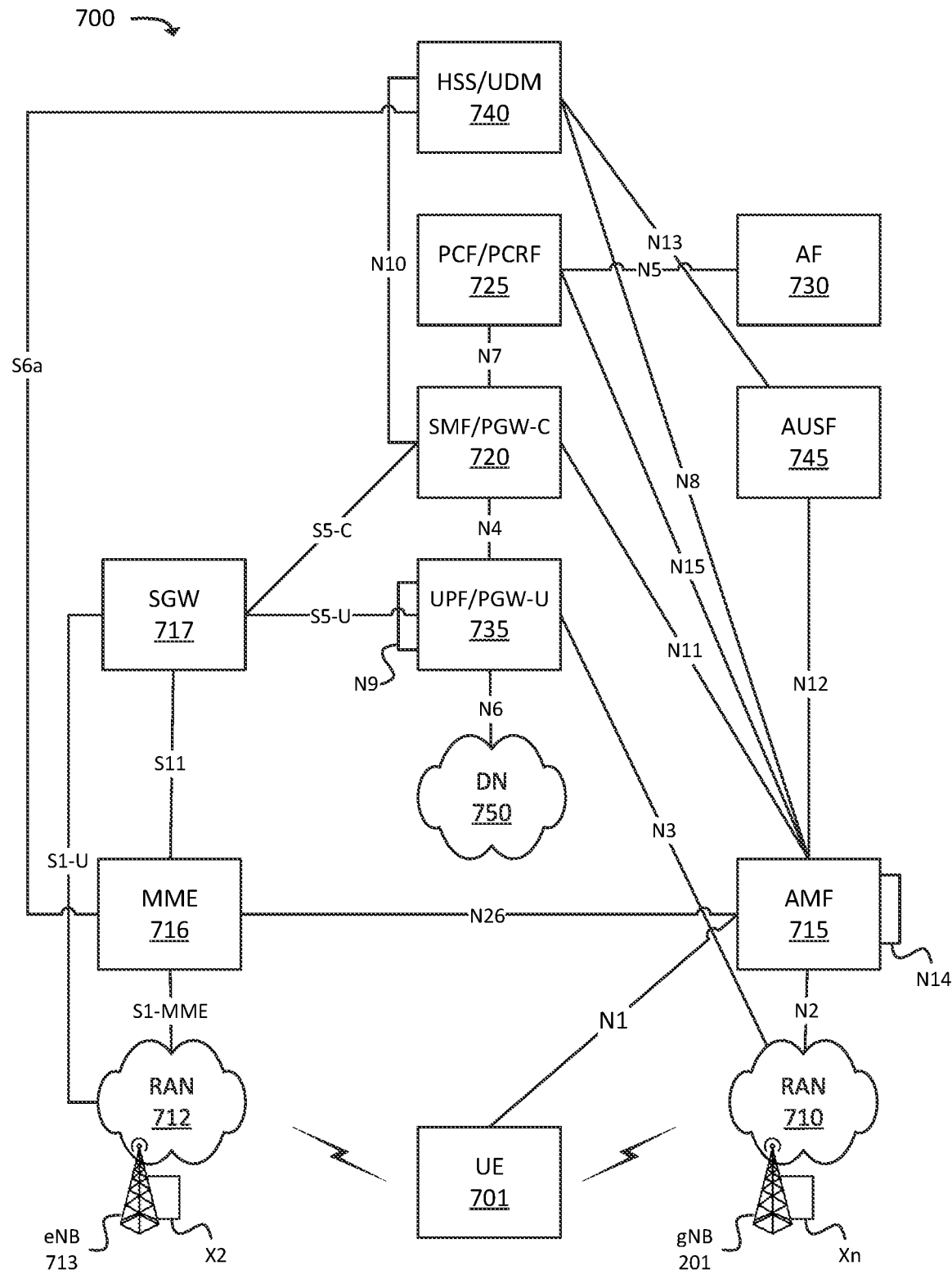
FIG. 7 illustrates an example environment in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more gNBs 201), RAN 712 (which may include one or more one or more evolved Node Bs ("eNBs") 713), and various network functions such as Access and Mobility Management Function ("AMP") 715, Mobility Management Entity ("MME") 716, Serving Gateway ("SGW") 717, SMF/PDN Gateway ("PGW")-Control plane function ("PGW-C") 720, Policy Control Function ("PCF")/Policy Charging and Rules Function ("PCRF") 725, Application Function ("AF") 730, UPF/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. For example, as discussed above, one or more of the interfaces shown in FIG. 7 may be implemented by, and/or may include, routing fabric 203. Thus, some or all traffic (e.g., user plane traffic) routed to, from, or between elements of environment 700 may traverse one or more instances of routing component 101.

In some embodiments, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 201), via which UE 701 may communicate with one or more other elements of environment 700. UE 701 may communicate with RAN 710 via an air interface (e.g., as provided by gNB 201). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, UPF-U 105, UPF-C 107, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, VNFs, etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 201, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

In some embodiments, UPF/PGW-U 735 may include one or more instances of UPF-C 107. As discussed above, some functionality associated with UPF/PGW-U 735 may be implemented by one or more instances of UPF-U 105.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate. In some embodiments, DN 750 may be, or may include, PDN 207 discussed above.

Figure 8:
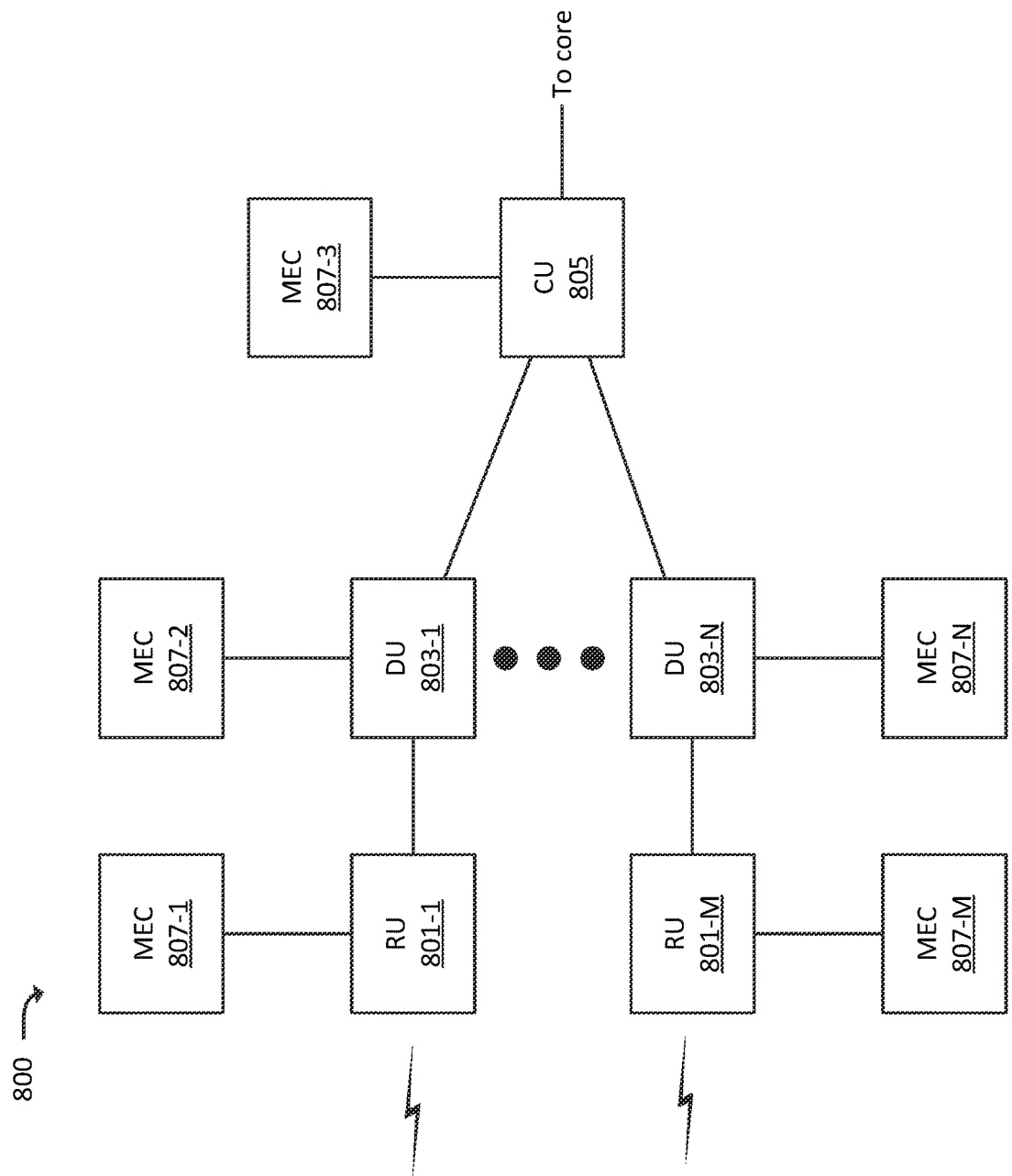
FIG. 8 illustrates an example arrangement of a RAN, in accordance with some embodiments.

FIG. 8 illustrates an example Distributed Unit ("DU") network 800, which may be included in and/or implemented by one or more RANs (e.g., RAN 710). In some embodiments, a particular RAN may include one DU network 800. In some embodiments, a particular RAN may include multiple DU networks 800. In some embodiments, DU network 800 may correspond to a particular gNB 201 of a 5G RAN (e.g., RAN 710). In some embodiments, DU network 800 may correspond to multiple gNBs 201. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

In some embodiments, some of the operations, messages, signaling, etc. described above with respect to gNB 201 may be associated with CU 805. For example, in some embodiments, traffic sent to CU 805 (e.g., via routing fabric 203) may be processed in a manner described above (e.g., as described above with respect to network component 101, UPF-U 105, etc.), and traffic sent by CU 805 may be processed in a manner described above (e.g., as described above with respect to network component 101, UPF-U 105, etc.).

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network.

Figure 9:
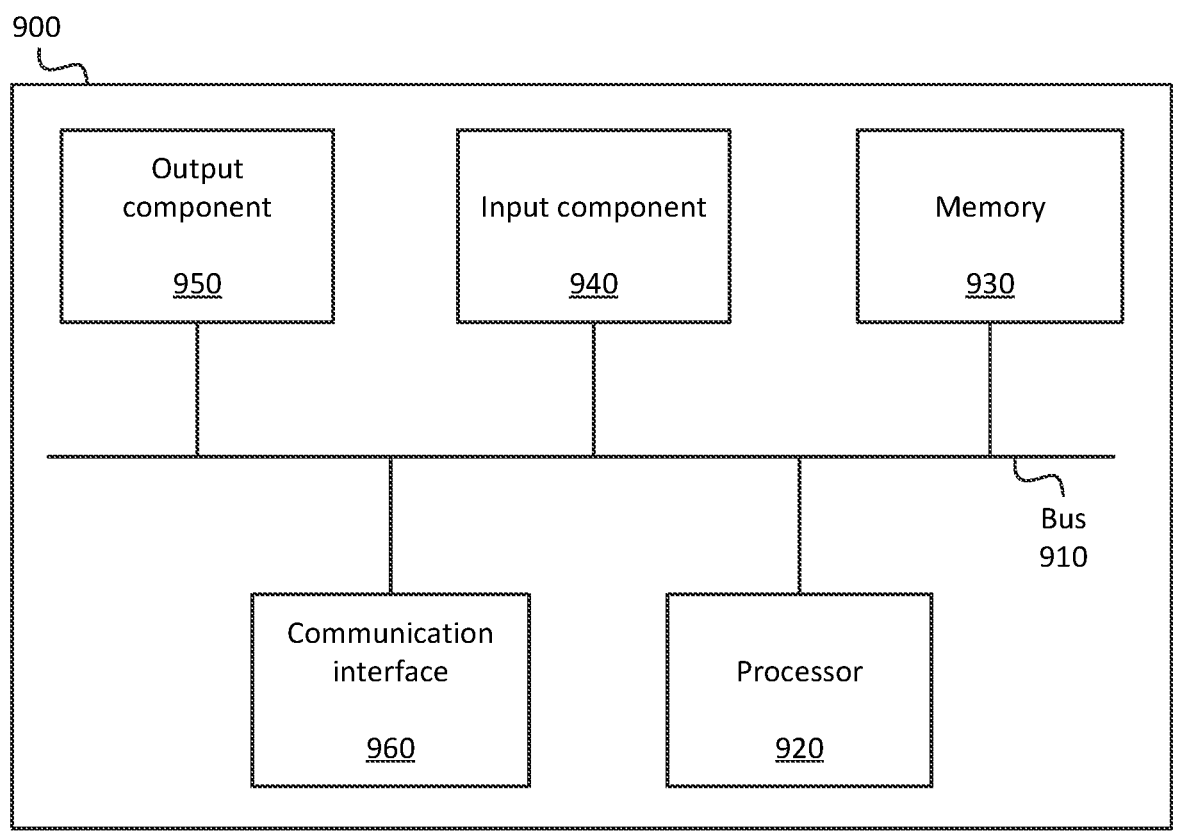
FIG. 9 illustrates example functional components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 4-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
one or more processors configured to:
receive first traffic that is associated with a particular destination;
provide the received first traffic to a second device, wherein the second device:
processes the first traffic according to a particular set of policies associated with the first traffic, and
forwards the processed first traffic to the particular destination associated with the first traffic;
receive, from the second device, the particular set of policies associated with the first traffic;
receive second traffic that is associated with the particular destination;
process the second traffic according to the particular set of policies received from the second device; and
forward the processed second traffic to the particular destination without providing the second traffic to the second device.

2. The first device of claim 1, wherein the first device includes user plane functionality associated with a particular network function of a core of a wireless network, and wherein the second device includes control plane functionality associated with the particular network function of the core of the wireless network.

3. The first device of claim 1, wherein the one or more processors are further configured to:
  determine, based on receiving the second traffic, that the second traffic is associated with a same traffic flow as the first traffic, wherein processing the second traffic according to the particular set of policies is performed based on determining that the second traffic is associated with the same traffic flow as the first traffic.

4. The first device of claim 3, wherein the one or more processors are further configured to:
  determine that the first and second traffic are associated with a same flow identifier, wherein determining that the second traffic is associated with the same traffic flow as the first traffic is based on determining that the first and second traffic are associated with the same flow identifier.

5. The first device of claim 1, wherein the one or more processors include a configurable circuit that is configured based on the received particular set of policies, wherein processing the second traffic according to the particular set of policies includes processing the second traffic by the configurable circuit.

6. The first device of claim 1, wherein the one or more processors are further configured to:
  determine that the first traffic is not associated with an existing traffic flow, wherein providing the first traffic to the second device is performed based on determining that that the first traffic is not associated with an existing traffic flow.

7. The first device of claim 1, wherein processing the second traffic includes identifying a tunnel endpoint toward which the second traffic is to be forwarded, wherein forwarding the processed second traffic to the particular destination includes forwarding the processed traffic toward the tunnel endpoint.

8. A non-transitory computer-readable medium, storing a plurality of processor-executable instructions to:
  receive first traffic that is associated with a particular destination;
  provide the received first traffic to a particular device, wherein the particular device:
    processes the first traffic according to a particular set of policies associated with the first traffic, and
    forwards the processed first traffic to the particular destination associated with the first traffic;
  receive, from the particular device, the particular set of policies associated with the first traffic;
  receive second traffic that is associated with the particular destination;
  process the second traffic according to the particular set of policies received from the particular device; and
  forward the processed second traffic to the particular destination without providing the second traffic to the particular device.

9. The non-transitory computer-readable medium of claim 8, wherein the particular device is a first device, wherein providing the first traffic to the first device is performed by a second device that includes user plane functionality associated with a particular network function of a core of a wireless network, and wherein the first device includes control plane functionality associated with the particular network function of the core of the wireless network.

10. The non-transitory computer-readable medium of claim 8, wherein the one or more processors are further configured to:
  determine, based on receiving the second traffic, that the second traffic is associated with a same traffic flow as the first traffic, wherein processing the second traffic according to the particular set of policies is performed based on determining that the second traffic is associated with the same traffic flow as the first traffic.

11. The non-transitory computer-readable medium of claim 10, wherein the one or more processors are further configured to:
  determine that the first and second traffic are associated with a same flow identifier, wherein determining that the second traffic is associated with the same traffic flow as the first traffic is based on determining that the first and second traffic are associated with the same flow identifier.

12. The non-transitory computer-readable medium of claim 8, wherein the plurality of processor-executable instructions include processor-executable instructions to configure a configurable circuit based on the received particular set of policies, wherein the configurable circuit processes the second traffic according to the particular set of policies.

13. The non-transitory computer-readable medium of claim 8, wherein the plurality of processor-executable instructions further include processor-executable instructions to:
  determine that the first traffic is not associated with an existing traffic flow, wherein providing the first traffic to the particular device is performed based on determining that that the first traffic is not associated with an existing traffic flow.

14. The non-transitory computer-readable medium of claim 8, wherein processing the second traffic includes identifying a tunnel endpoint toward which the second traffic is to be forwarded, wherein forwarding the processed second traffic to the particular destination includes forwarding the processed traffic toward the tunnel endpoint.

15. A method, comprising:
  receiving first traffic that is associated with a particular destination;
  providing the received first traffic to a particular device, wherein the particular device:
    processes the first traffic according to a particular set of policies associated with the first traffic, and
    forwards the processed first traffic to the particular destination associated with the first traffic;
  receiving, from the particular device, the particular set of policies associated with the first traffic;
  receiving second traffic that is associated with the particular destination;
  processing the second traffic according to the particular set of policies received from the particular device; and
  forwarding the processed second traffic to the particular destination without providing the second traffic to the particular device.

16. The method of claim 15, wherein the particular device is a first device, wherein providing the first traffic to the first device is performed by a second device that includes user plane functionality associated with a particular network function of a core of a wireless network, and wherein the first device includes control plane functionality associated with the particular network function of the core of the wireless network.

17. The method of claim 15, further comprising:
determining, based on receiving the second traffic, that the second traffic is associated with a same traffic flow as the first traffic, wherein processing the second traffic according to the particular set of policies is performed based on determining that the second traffic is associated with the same traffic flow as the first traffic.

18. The method of claim 17, further comprising:
determining that the first and second traffic are associated with a same flow identifier, wherein determining that the second traffic is associated with the same traffic flow as the first traffic is based on determining that the first and second traffic are associated with the same flow identifier.

19. The method of claim 15, further comprising:
determining that the first traffic is not associated with an existing traffic flow, wherein providing the first traffic to the particular device is performed based on determining that that the first traffic is not associated with an existing traffic flow.

20. The method of claim 15, wherein processing the second traffic includes identifying a tunnel endpoint toward which the second traffic is to be forwarded, wherein forwarding the processed second traffic to the particular destination includes forwarding the processed traffic toward the tunnel endpoint.

* * * * *